US011685549B2

(12) United States Patent
  Clark

(10) Patent No.: US 11,685,549 B2
(45) Date of Patent: Jun. 27, 2023

(54) MULTIPLE GROUNDING CONNECTOR FOR HANGAR GROUNDING POINT

(71) Applicant: Michael W. Clark, Wake Forest, NC (US)

(72) Inventor: Michael W. Clark, Wake Forest, NC (US)

( * ) Notice: Subject to any disclaimer, the term of this patent is extended or adjusted under 35 U.S.C. 154(b) by 188 days.

(21) Appl. No.: 17/365,456

(22) Filed: Jul. 1, 2021

(65) Prior Publication Data

US 2023/0002077 A1  Jan. 5, 2023

(51) Int. Cl.
  *H02G 9/00*  (2006.01)
  *B64F 1/16*  (2006.01)
  *B64D 45/02*  (2006.01)
  *H02G 9/02*  (2006.01)
  *H01R 4/66*  (2006.01)

(52) U.S. Cl.
  CPC ................ *B64F 1/16* (2013.01); *B64D 45/02* (2013.01); *H01R 4/66* (2013.01); *H02G 9/025* (2013.01)

(58) Field of Classification Search
  CPC .. B64F 1/16; B64D 45/02; H01R 4/66; H02G 9/025
  See application file for complete search history.

(56) References Cited

U.S. PATENT DOCUMENTS

| 5,909,005 | A | * | 6/1999 | Boston | H01R 4/66 248/539 |
| 6,160,217 | A | * | 12/2000 | Auclair | H01R 4/64 174/59 |
| 8,163,993 | B2 | * | 4/2012 | Gordin | H01R 4/66 439/98 |
| 2,481,913 | A1 | | 5/2012 | Buhri et al. | |
| 2002/0039846 | A1 | | 4/2002 | Lazaro, Jr. et al. | |
| 2012/0122328 | A1 | | 5/2012 | Buhri et al. | |
| 2017/0373407 | A1 | | 12/2017 | Tobin | |

FOREIGN PATENT DOCUMENTS

IN  6767/CHE/2014  1/2016
WO  0055944 A1  9/2000

* cited by examiner

*Primary Examiner* — Pete T Lee
(74) *Attorney, Agent, or Firm* — James G. Passe; Passe Intellectual Property LLC

(57) ABSTRACT

A device that is capable of creating multiple connections on a grounding point in a single airport hangar, as well as reducing the likelihood of there being a tripping hazard over the connected cables, while also assisting in preventing damage to cable connections which may result from vehicles being driven inside an airport hangar.

6 Claims, 3 Drawing Sheets

MULTIPLE GROUNDING CONNECTOR FOR HANGAR GROUNDING POINT

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a device for creating multiple connections on a single airport hangar grounding point and reducing the danger of tripping over connected cables.

Description of Related Art

The grounding point for an aircraft is provided for removal and control of static electrical accumulations on an aircraft while aircrafts are stored or undergoing servicing in a hangar, and while the aircraft is connected to the grounding point. Floor-grounding points are either grounded through individually driven electrodes or are electrically bonded together in a grid system with the entire system grounded to underground metal piping or driven electrodes. Grounding the aircraft is usually done to protect the aircraft and personnel against hazards from lightning discharge, provide current return paths, protect personnel from shock hazard, and prevent accumulation of static charge.

Floor-grounding receptacles are supposed to be designed to minimize the tripping hazard; however that is only true so long as nothing is connected to the connecting point. Once a grounding cable is attached to a grounding point, it creates a tripping hazard. This is especially true when multiple grounding cables are attempted to be connected to the same grounding point. Another issue arises with damage to the cable connections at the grounding point as a result of vehicles driving around the airport hangar.

BRIEF SUMMARY OF THE INVENTION

The present invention relates to a novel device that connects to the airplane hangar grounding point which allows for multiple safe connections reduces tripping hazards for connected cables, and helps prevent damage to connected cables from vehicles in motion inside the hanger.

Accordingly, in one embodiment, there is a grounding disk having a top and a bottom for use on an airport hangar grounding point comprising:
a) a grounding connector on the bottom of the grounding disk capable of connecting to the airport hangar grounding point;
b) a plurality of connecting grounding points connected to the grounding connector, each connecting grounding point having a connection point on the top of the grounding disk for attachment to a grounding cable and positioned below the top of the grounding disk;
c) wherein the top surface of the grounding disk is tapered from a center of the top surface to a peripheral edge of the top surface; and
d) wherein the grounding disk can support at least 1000 lbf.

DETAILED DESCRIPTION OF THE INVENTION

Figure 1:
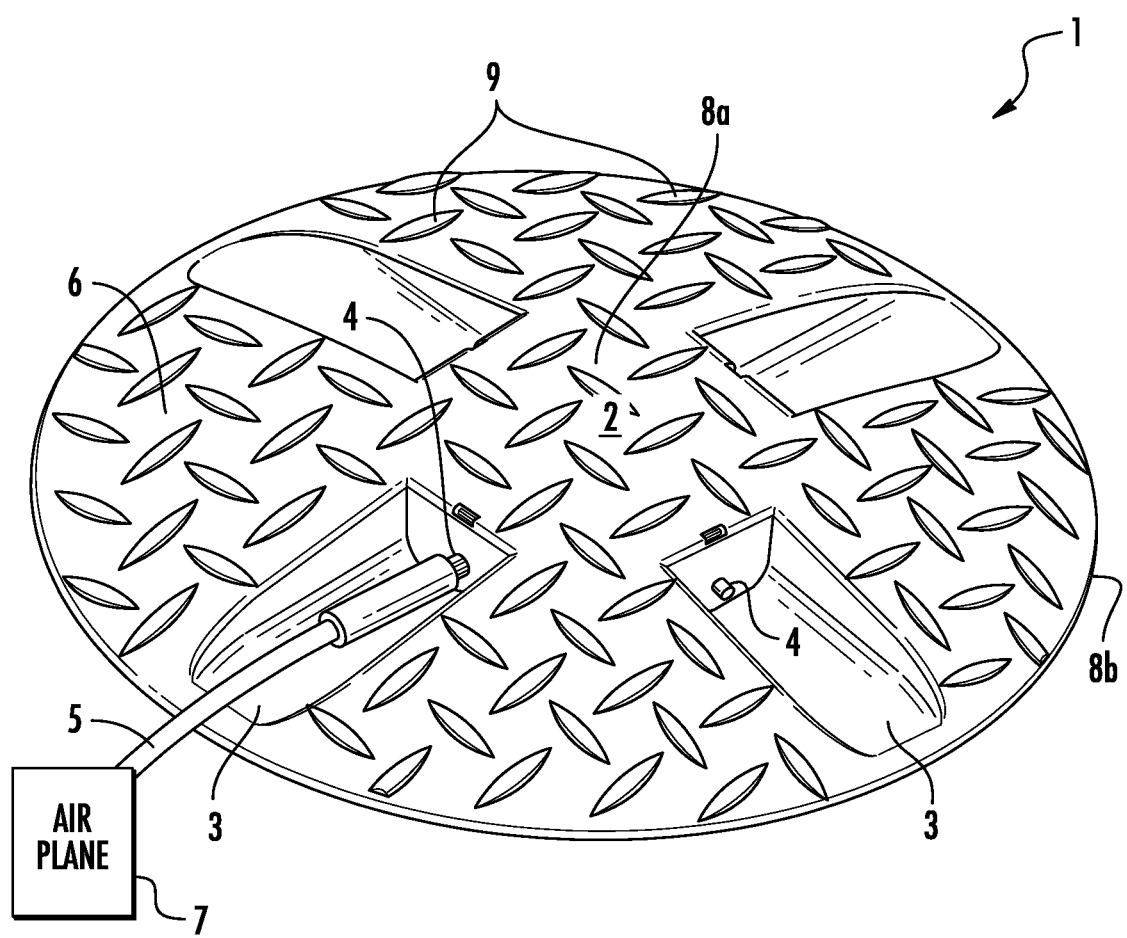
FIG. 1 is a perspective view of the top of the grounding disk.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

DEFINITIONS

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto.

The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "grounding disk" refers to a device that fits onto an airport hangar grounding point to provide both multiple connecting grounding points, as well as protection of the cables from vehicles driving over the airport hangar grounding point. The airport hangar grounding point is normally a vertical electrical connection point, such as a vertical rod. The grounding disk fits over the airport hangar grounding point and makes an electrical connection and splits off to make two or more connecting grounding points. It is noted that there are recesses in the top of the grounding disk for attaching the grounding cable and since it is recessed below, the top protects the cable connection if someone runs over the grounding disk with a vehicle. In the embodiment shown in the drawings, the disk is round, but any shape can serve the purpose including rectangular, and the like. The grounding disk is reinforced, such that it can support at least 1000 lbf (pound force). The grounding disk, in another embodiment, is about 11 to 14 inches in diameter. The disk has a center height in one embodiment of about 1.5 to about 2.5 inches. In one embodiment, the disk is made of a reinforced plastic, but metal and other materials can be used as long as they don't cause faulty grounding.

As used herein, the term "airport hangar grounding point" refers to built into the floor grounding bars or rods used during the refueling process to ensure that the plane and the refueling apparatus are at the same electrical potential and to dissipate the electrical charge that is generated by the fuel transfer process. The airplane is connected to the airport hangar grounding point by use of a grounding cable.

As used herein, the term "grounding connector" refers to a connector at the bottom of the grounding disk capable of connecting to an airport hangar grounding point. Shown in the figures, is an example of a connecting point for fitting on an upright airport hangar grounding point. The grounding disk has a recessed cavity for accepting the airport hangar grounding point and making an electrical connection.

As used herein, the term "capable of connecting" refers to the grounding connector being of a shape and configuration to attach electrically to the airport hangar grounding point. It can do this by any method of connection, including a recessed grounding connector, and the like.

As used herein, the term "connecting grounding points" refers to connectors that connect a grounding cable in a position to ensure a solid clip, screw, connecting attachment, bayonet type connector, plug, or the like. This replaces the use of spring-loaded clips that can easily be kicked loose.

As used herein, the term "grounding cable" refers to a cable that at one end connects to an airplane or other device that needs grounding, and at the other end is connected to one of the static grounding points in the hangar floor.

As used herein, the term "top surface" refers to the uppermost portions of the top of the grounding disk, as opposed to the recesses on the top that are designed to attach a grounding cable to, and protect the connection of the grounding cable to the grounding connector. The figures help with understanding the top surface. In one embodiment, the top surface is textured.

As used herein, the term "positioned below the top surface" refers to the channels that one can connect a grounding cable to and since they are in a recess, the channels protect the grounding cable from damage resulting from running over a cable connector.

As used herein, the term "tapered" refers to the grounding disk being higher in the middle and tapering down to the edge of the grounding disk. This allows a vehicle to run over the grounding disk without dislodging or damaging the grounding disk. In one embodiment, the disk is about 2 inches high in the center and tapers down to a quarter to a half inch at the edges. In one embodiment, the disk is about 13 inches in diameter.

DRAWINGS

Now referring to the drawings, FIG. 1 is a perspective top view of the grounding disk of the present invention. In this view, grounding disk 1 has a top 6 with top surface 2 and multiple recesses 3. Shown are screw connectors 4, wherein a grounding cable 5 is shown attached thereto. The other end of the grounding cable 5 is attached to an airplane to ground the airplane 7. The top surface 2 in this embodiment is shown as textured 9, but can be any surface configuration as desired. The grounding disk 1 is highest at point 8a and tapers down to edge 8b.

Figure 2:
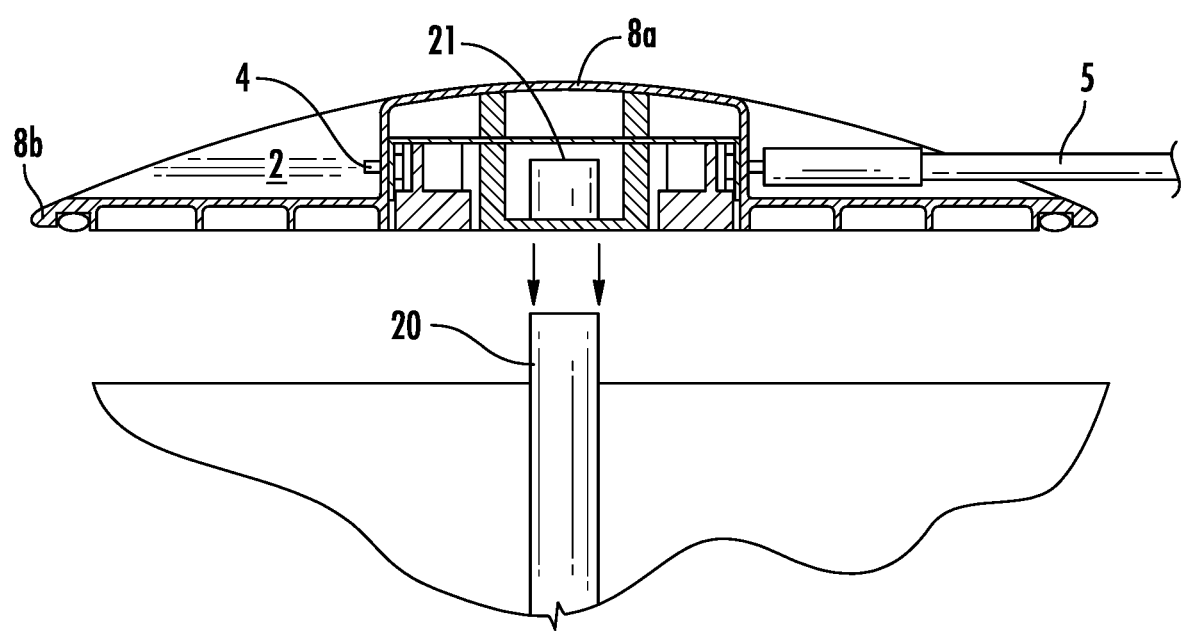
FIG. 2 is a cut away view of the grounding disk showing what is underneath the top of the grounding disk and the tapered shape.

FIG. 2 is a cutaway view of the grounding disk 1 and the airport hangar grounding point 20. In this view, there is a grounding connector 21 which fits over and connects to airport hangar grounding point 20 and screw connectors 4 are connected electrically to the grounding cable 5.

Figure 3:
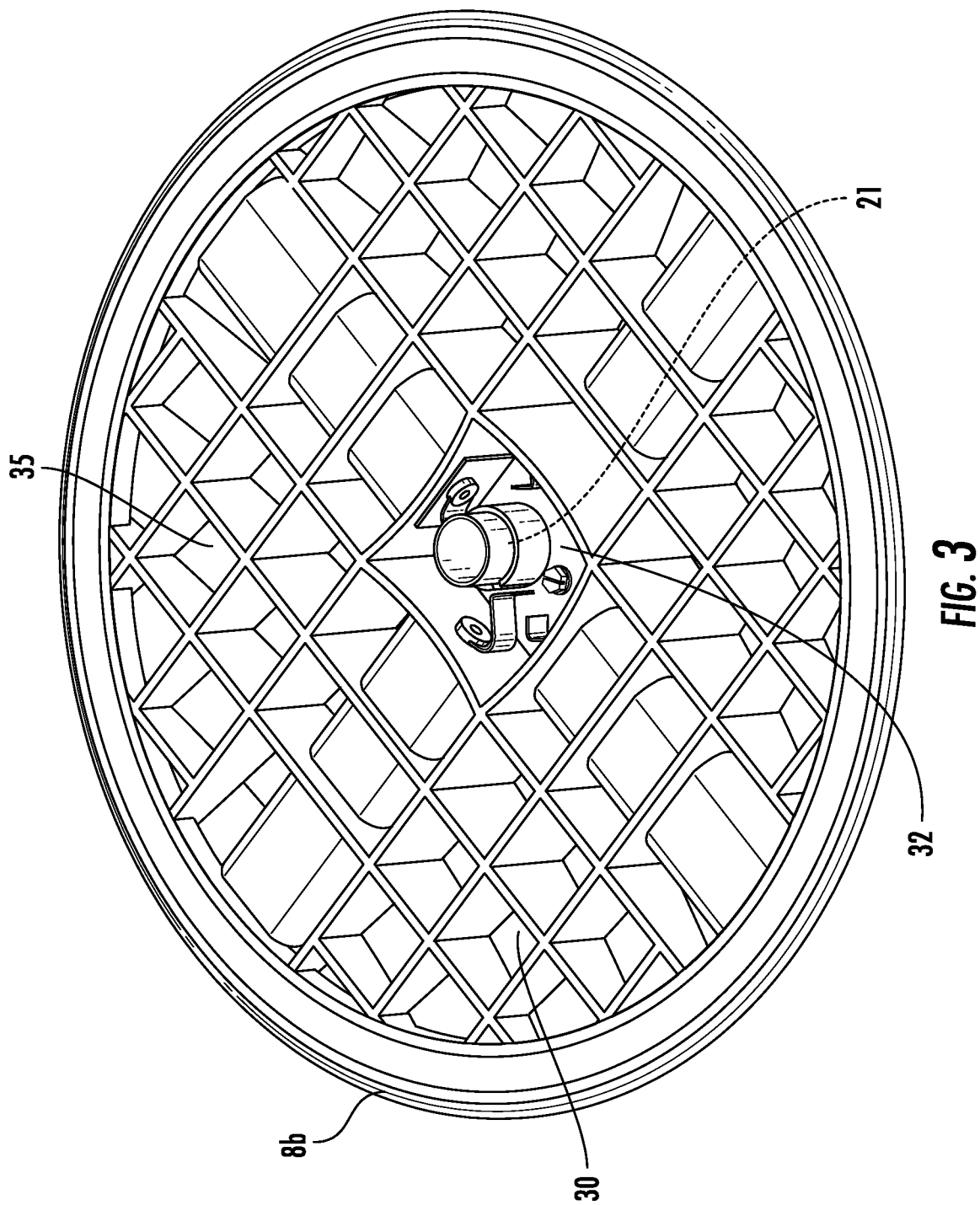
FIG. 3 is a perspective view of the bottom of the grounding disk.

FIG. 3 is a perspective view of the bottom 30 of grounding disk 1. In this view, the electrical connection 32 is shown between the grounding connector 21 and screw connectors 4 (inside view). Also shown in this view, is a reinforcing square 35, built into the grounding disk 1 in order to improve the amount of pressure it will take.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A grounding disk having a top and a bottom for use on an airport hangar grounding point comprising:
    a) a grounding connector on the bottom of the grounding disk capable of connecting to the airport hangar grounding point;
    b) a plurality of connecting grounding points connected to the grounding connector, each connecting grounding point having a connection point on the top side of the grounding disk for attachment to a grounding cable, and positioned below the top surface of the grounding disk;
    c) wherein the top surface of the grounding disk is tapered from a center of the top surface to a peripheral edge of the top surface; and
    d) wherein the grounding disk can support at least 1000 lbf.

2. The grounding disk according to claim 1, wherein the grounding disk has a height at the center of the top surface of about 1.5 to about 2.5 inches.

3. The grounding disk according to claim 1, wherein the diameter of the grounding disk is about 11 to about 14 inches.

4. The grounding disk according to claim 1, wherein the grounding disk is made of a reinforced plastic material.

5. The grounding disk according to claim 1, wherein the top surface of the grounding disk is textured.

6. The grounding disk according to claim 1 wherein the grounding disk is circular.

\* \* \* \* \*